Feb. 3, 1959  A. B. MERRY ET AL  2,871,585
MOTOR POWER UNIT

Filed May 16, 1956  5 Sheets-Sheet 1

INVENTORS
ALBERT B. MERRY AND
PAUL F. HASTINGS

Caswell & Lagaard
ATTORNEYS

Feb. 3, 1959     A. B. MERRY ET AL     2,871,585
MOTOR POWER UNIT

Filed May 16, 1956                                             5 Sheets-Sheet 2

INVENTORS
ALBERT B. MERRY AND
PAUL F. HASTINGS

*Caswell & Lagaard*
ATTORNEYS

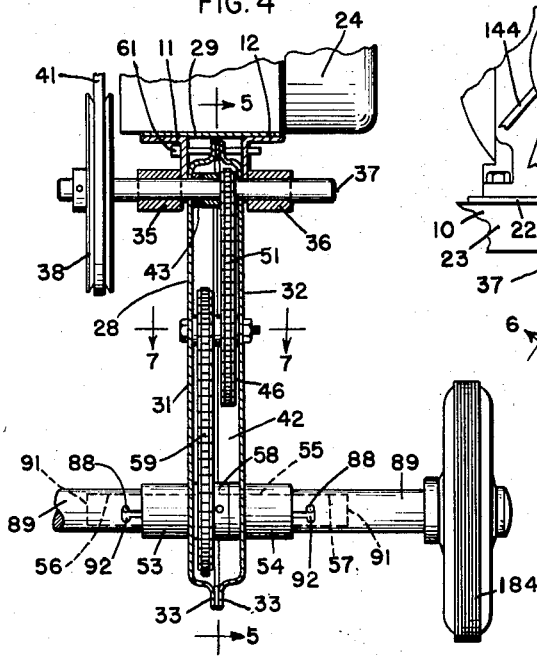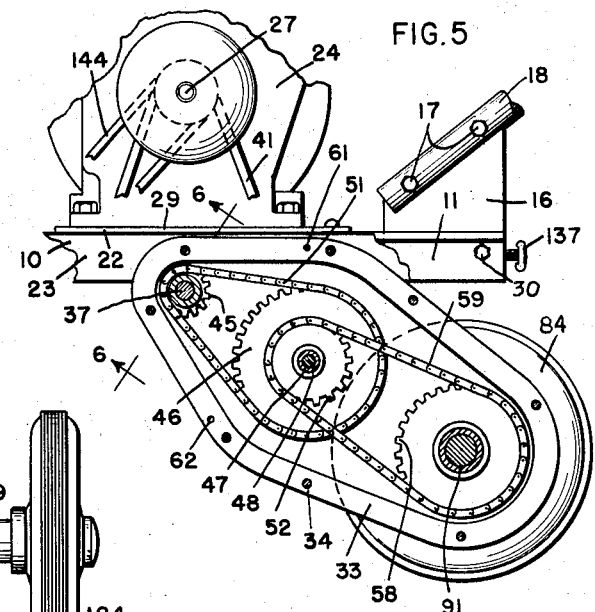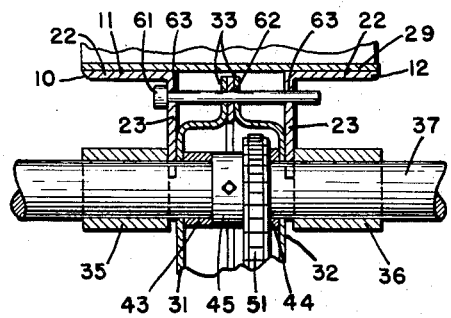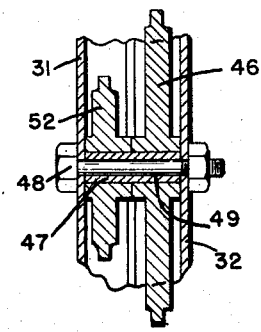

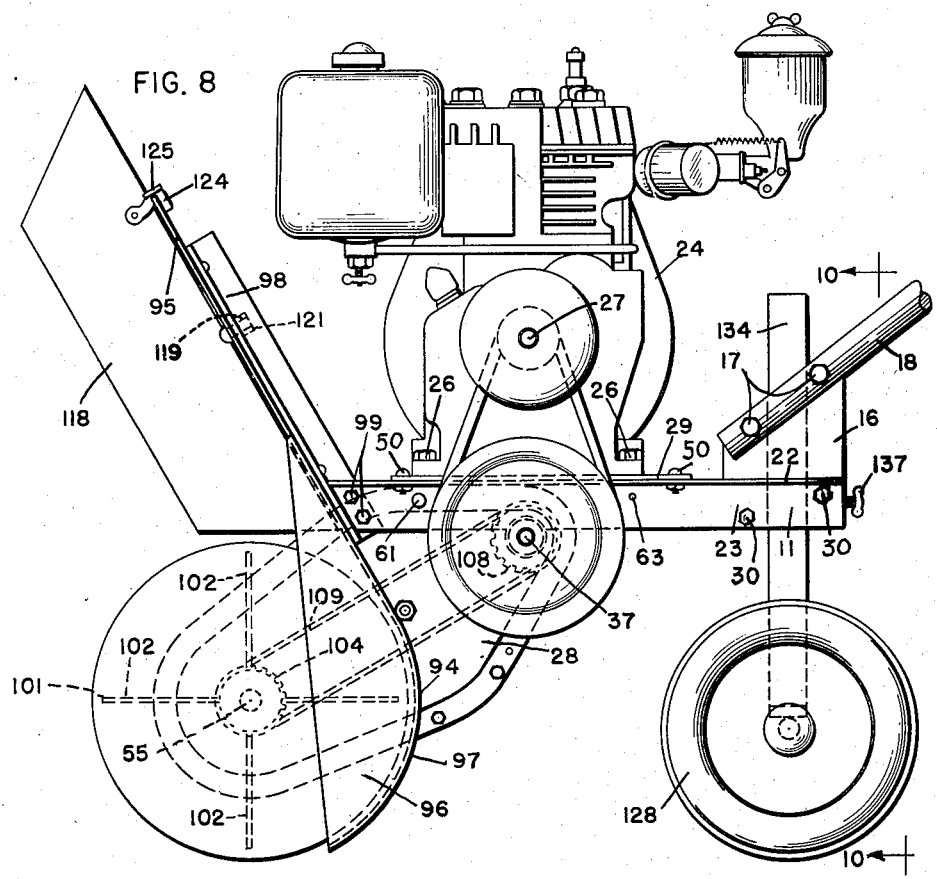
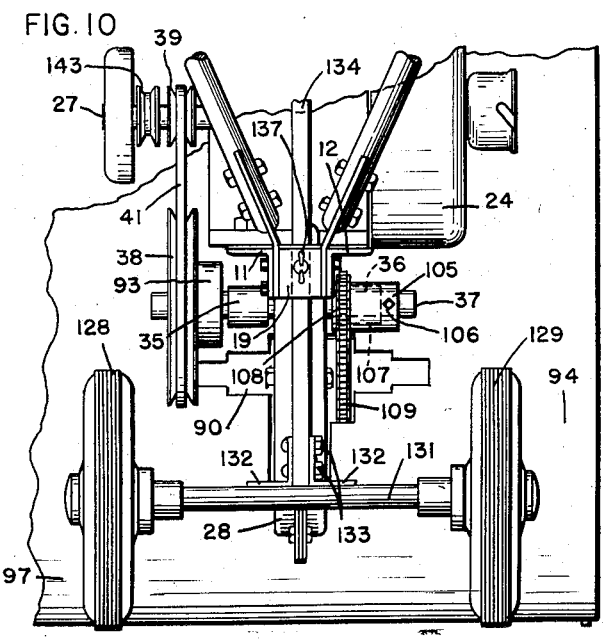
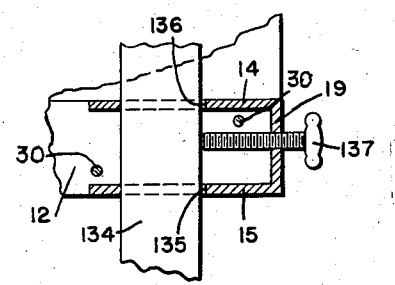
INVENTORS
ALBERT B. MERRY AND
PAUL F. HASTINGS
ATTORNEYS Feb. 3, 1959  A. B. MERRY ET AL  2,871,585
MOTOR POWER UNIT Filed May 16, 1956  5 Sheets-Sheet 5

INVENTORS
ALBERT B. MERRY AND
PAUL F. HASTINGS

Caswell & Lagaard
ATTORNEYS

United States Patent Office 2,871,585
Patented Feb. 3, 1959

2,871,585

MOTOR POWER UNIT

Albert B. Merry and Paul F. Hastings, Spokane, Wash.

Application May 16, 1956, Serial No. 585,249

6 Claims. (Cl. 37—43)

The herein disclosed invention relates to motor driven yard implements and particularly to a motor power unit for operating such implements.

An object of the invention resides in providing a power unit which may be used for operating different implements and devices.

Another object of the invention resides in providing a power unit having a driving shaft disposed near the lowermost portion thereof and which may be shifted to either a forward position or a rearward position relative to the unit.

A still further object of the invention resides in constructing the unit with a frame carrying a motor and in providing a transmission case disposed generally below said frame and carrying at its lower end a driven shaft driven from said motor, said case being pivoted to said frame for swinging movement in a back and forth direction.

An object of said invention resides in providing a countershaft journaled for rotation in bearings carried by said frame and driven by said motor and in further pivoting said case for swinging movement about the axis of the countershaft and in driving the driven shaft from said countershaft by a transmission contained within said case.

An object of the invention resides in utilizing said driven shaft when the case is in one position for driving traction wheels, and when in another position for driving a rotating member of an implement.

Another object of the invention resides in providing a transmission disposed exteriorly of the case, driven by the motor and operating another rotating member of the implement.

A still further object of the invention resides in providing a power unit capable of being used to operate a snow blower, a wheel propelled mower, a cultivator and numerous other yard implements.

Other objects of the invention reside in the novel combination and arrangement of parts and in the details of construction hereinafter illustrated and/or described.

In the drawings:

Fig. 3 is a fragmentary elevational-sectional view taken on line 3—3 of Fig. 1.

Fig. 4 is a fragmentary plan sectional view taken on line 4—4 of Fig. 1.

Fig. 5 is an elevational-sectional view taken on line 5—5 of Fig. 4.

Fig. 6 is a fragmentary elevational-sectional view taken on line 6—6 of Fig. 5.

Fig. 7 is a fragmentary elevational view taken on line 7—7 of Fig. 4.

Fig. 8 is a view similar to Fig. 1 showing the power unit applied to a snow blower.

Fig. 10 is a rear elevational-sectional view taken on line 10—10 of Fig. 8.

Fig. 11 is an elevational view partly in section of a portion of the rear wheel supporting structure shown in Fig. 8 and drawn to a greater scale.

Figure 1:
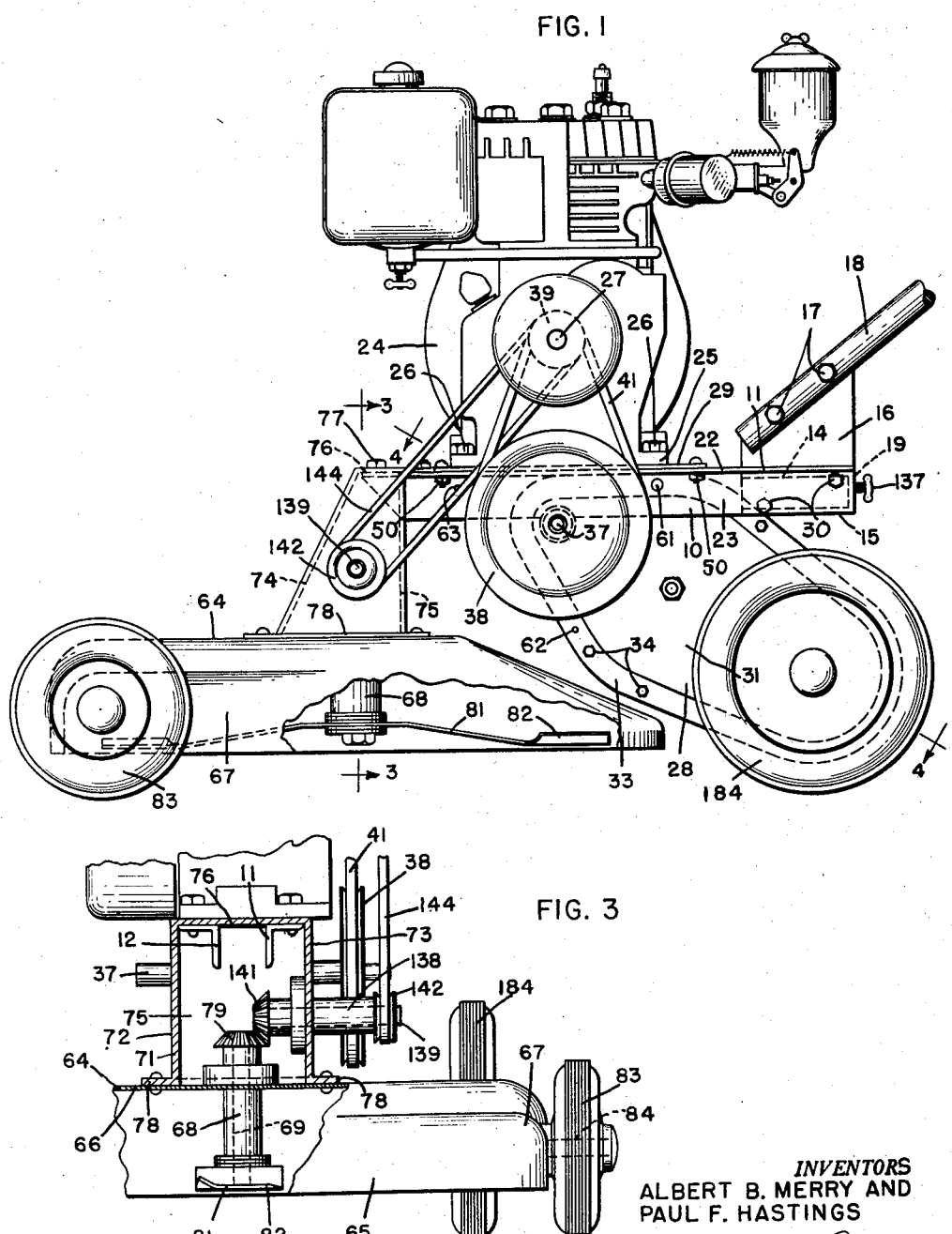
Fig. 1 is a side elevational view of an embodiment of the invention applied to a wheel propelled mower.

The power unit comprises a frame 10 which consists of two longitudinally extending angle-shaped frame members 11 and 12 having horizontal flanges 22 and vertical flanges 23. These frame members are secured together at the forward portions of the same by means of a motor base plate 29 and at the rearward end of the same by means of a construction including two vertically spaced horizontal plates 14, 15 and an end plate 19. The plate 29 is bolted to the flanges 22 of frame members 10 and 11 by means of bolts 50. The plates 14, 15 and 19 are securely welded to two upstanding brackets 16 which overlie the flanges 23 of the frame members 11 and 12 at the rearward end of the frame. These brackets are secured to said flanges by means of bolts 30. The brackets 16 have attached to them by means of bolts 17 handlebars 18 which terminate at their ends in hand grips 20. A cross brace 21 secured to the said handlebars stiffens and reinforces the same at their upper ends.

Resting on the motor base plate 29 is a gasoline motor 24 constructed in the usual manner. This motor has a base 25 which overlies the plate 29 and which is bolted to the flanges 22 by means of bolts 26. The motor also includes a crankshaft 27 and the motor is so arranged that the crankshaft extends transversely of the frame 10. Since gasoline motors are well known in the art and since the construction of the same forms no particular feature of the instant invention the motor has not been illustrated in detail nor will it be further described.

Welded to the lowermost portions of flanges 23 of the frame members 11 and 12 are two aligning bearings 35 and 36 best shown in Fig. 6. These bearings support a countershaft 37 which extends transversely of the frame 10 and parallel to the crankshaft 27 of the motor 24. The said countershaft extends outwardly beyond the frame 10 and has mounted on it a sheave 38. Also mounted on the crankshaft 27 is a sheave 39 which lies in the plane of the sheave 38. A V-belt 41 passes over these sheaves and drives the shaft 37 at a reduced rate of speed.

Disposed below the frame 10 is an elongated transmission case 28 formed in two halves 31 and 32. The halves 31 and 32 are provided with flanges 33 which are bolted together by means of bolts 34 as best shown in Fig. 2. This construction provides a compartment 42 within the case. Secured to the inner portion of the halves 31 and 32 of the case, by welding, are two bearings 43 and 44 which are of a size to receive the countershaft 37. Mounted on the said countershaft and between the said bearings is a sprocket wheel 45. This sprocket wheel is situated to one side of the case and in alignment with another sprocket wheel 46 disposed near the center of the case. The sprocket wheel 46 rotates freely on a tubular shaft 47 (Fig. 7) which is attached to the case 28 by means of a bolt 48 extending through the bore 49 of said shaft and the two halves 31 and 32 of the case. A chain 51 passes over the two sprocket wheels 45 and 46. Wheel 45 is smaller than the wheel 46 so that wheel 46 is driven at a reduced rate of speed. Attached to the sprocket wheel 46, by welding, is another sprocket wheel 52 which is of smaller diameter and which is also journaled on the tubular shaft 47. These sprocket wheels travel together as a unit. At the lower end of the case 28 is provided two bearings 53 and 54 which are welded to the two halves 31 and 32 and whose bores are in alignment. These bearings rotatably support a driven shaft 55. This shaft has shaft extensions 56 and 57 disposed one on each side of the bearings 53 and 54 and to which the implements to be used with the invention may be attached. Mounted on the shaft 55 and within the compartment 42 is a sprocket wheel 58. This sprocket wheel is in the plane of the sprocket wheel 52 and a chain 59 passes over said sprocket wheels. Sprocket wheel 52 is smaller than sprocket wheel 58 and the shaft 55 is hence driven at a further reduced rate of speed. By means of the bearings 43 and 44 and the arrangement of the parts, the case may swing on the countershaft 37 as a pivot from the position shown in Fig. 1 to that shown in Fig. 8. The said case may be held in either of these positions by means of a pin 61 which passes through either of two holes 63 in the flanges 33 of the said case and registering holes 63 in the flanges 23 of the frame members 11 and 12.

Figure 2:
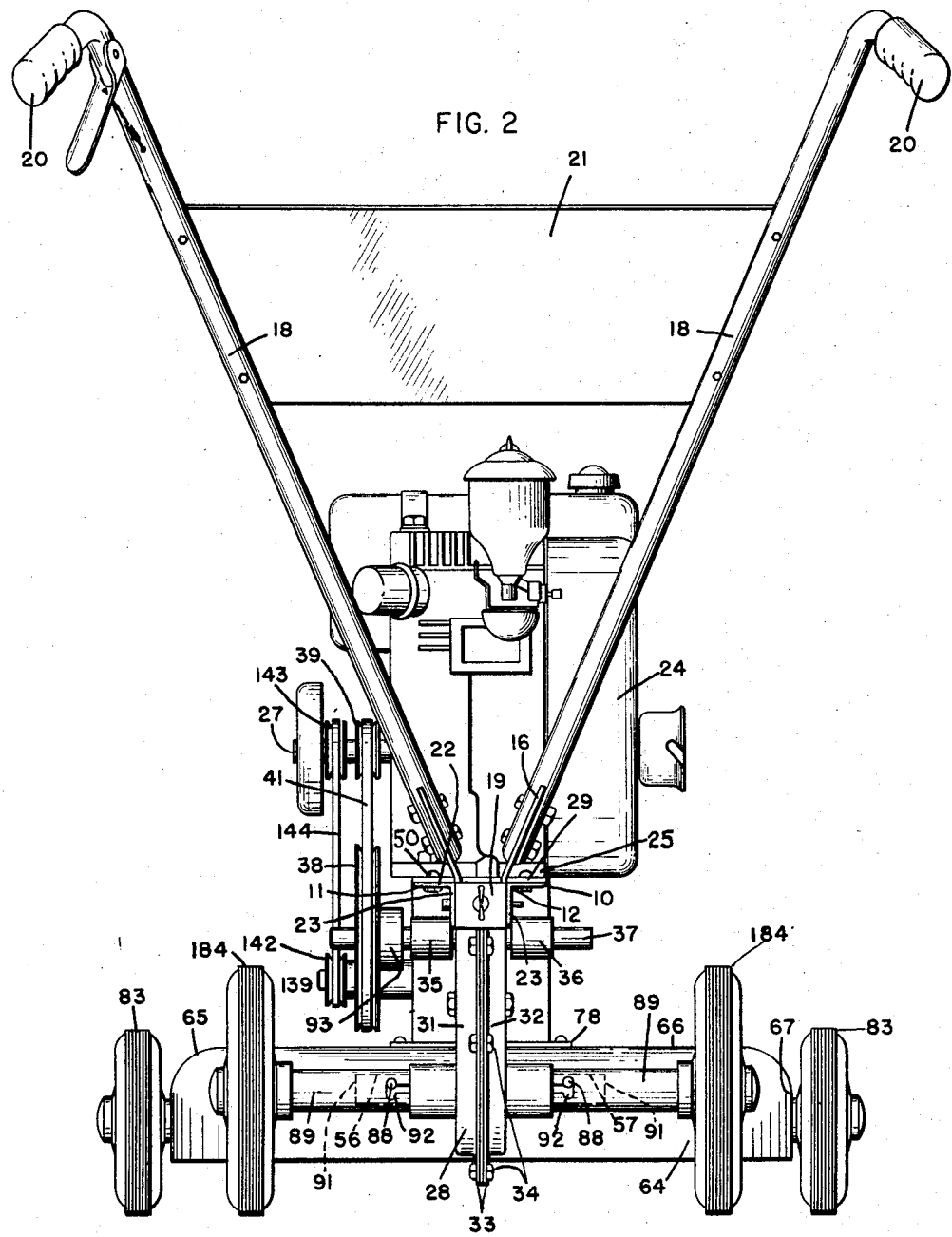
Fig. 2 is a rear elevational view of the structure shown in Fig. 1.

The power unit has been shown in Figs. 1, 2 and 3 as applied to a mower 64. This mower consists of a housing 65 which comprises a top 66 and a skirt 67 depending therefrom. A transmission case 71 is secured to the top 66 of the case and has side walls 72 and 73, a front wall 74, a rear wall 75 and a top 76. The front ends of the frame members 11 and 12 extend through the rear wall 75 and the flanges 22 thereof underlie the top 76. Cap screws 77 extend through the top 76 and are screwed into the flanges 22 to hold the case attached to frame 10. The lower ends of the walls 72, 73, 74 and 75 have flanges 78 which are riveted to the top 66 of the housing 65. Attached to the top 66 of housing 65 is a bearing 68 which rotatably supports a vertical shaft 69. Shaft 69 has mounted at the upper end of the same a bevel gear 79 which is disposed within the transmission case 71. The lower end of this shaft has attached to it a cutter 81 which is disposed within the housing 65 and which has a cutting blade 82 adapted to mow the vegetation as the mower is propelled over the ground. Attached to the wall 73 of case 71 is a horizontal bearing 138. This bearing supports a countershaft 139 for rotation. Shaft 139 has secured to the inner end of it a bevel gear 141 which meshes with the bevel gear 79. Exteriorly of the case 71, shaft 139 has secured to it a sheave 142. This sheave lies in the same plane as another sheave 143 mounted on the motor shaft 27. A belt 144 passes over these sheaves and drives the countershaft 139 which in turn drives shaft 69 and the cutter 81.

The cutter 81 is held at the proper elevation above the ground by means of two gage wheels 83 mounted on stub axles 84 secured to the skirt 67 of the housing 65 at the forward portions of the sides thereof.

When the unit is used in conjunction with a mower, the transmission case 28 is moved toward its rearward position and locked in place by the pin 61. In such case, two wheels 184 are mounted on the shaft extensions 56 and 57. For this purpose, these shaft extensions are provided with pins 88 which extend transversely therethrough and are disposed in close proximity to the bearings 53 and 54. The wheels 184 have attached to them hubs 89 which are provided with sockets 91 to receive said shaft extensions. T-shaped slots 92 in these hubs receive the pins 88 and hold the wheels attached to said stub shafts. A clutch 93 may also be mounted on the countershaft 37 and serves to connect said shaft to sheave 38. Such construction, forming no particular feature of the invention, has not been shown in detail and the construction and control thereof may be such as is now well known in the art.

In operation, the starting and stopping of the mower is controlled by the clutch 93, and when the mower is being propelled the blade 82 of cutter 81 cuts the vegetation as the direction of movement of the mower over the ground is controlled by the hand grips 20.

As previously explained, the unit may also be used with a snow blower as shown in Figs. 8 to 11 inclusive. When so used the transmission case 28 is moved to its forward position and held in such position by means of pin 61. The snow blower comprises a hood 94 which has a back 95 extending in a forwardly inclined relation. The lower portion 97 of the back 95 is curved as illustrated in Fig. 8 and has forwardly extending flanges 96 issuing from the lateral edges of the same. A hole 90 in the hood receives the forward portion of transmission case 28. The hood is stiffened by means of two angle-shaped ribs 98 which are riveted to the back 95. These ribs are bolted to the frame members 11 and 12 by means of bolts 99 whereby the hood 94 may be readily applied to or removed from the unit. The snow blower further includes a blower 101 which comprises a number of blades 102 welded to a hub 103. Hub 103 is bored to form a bearing which is rotatably mounted upon the exterior of the bearing 54 supporting the driven shaft 55 for rotation. The hub 103 has secured to it a sprocket wheel 104 and by means of which the blower is rotated. Secured to the countershaft 37 is a hub 105. This hub is attached to said countershaft by means of a set screw 106. The said hub has a socket 107 which receives the bearing 36 for said countershaft to bring said hub well over toward the transmission case 28. Mounted on the inner end of said hub is a sprocket 108 which is in the plane of the sprocket wheel 104. A chain 109 passes over this sprocket wheel and the sprocket wheel 104 and serves to drive the blower 101 therefrom. It will be noted that the sprocket wheels 108 and 104 are substantially the same size so that the blower 101 is driven at a higher rate of speed than the shaft 55.

Figure 9:
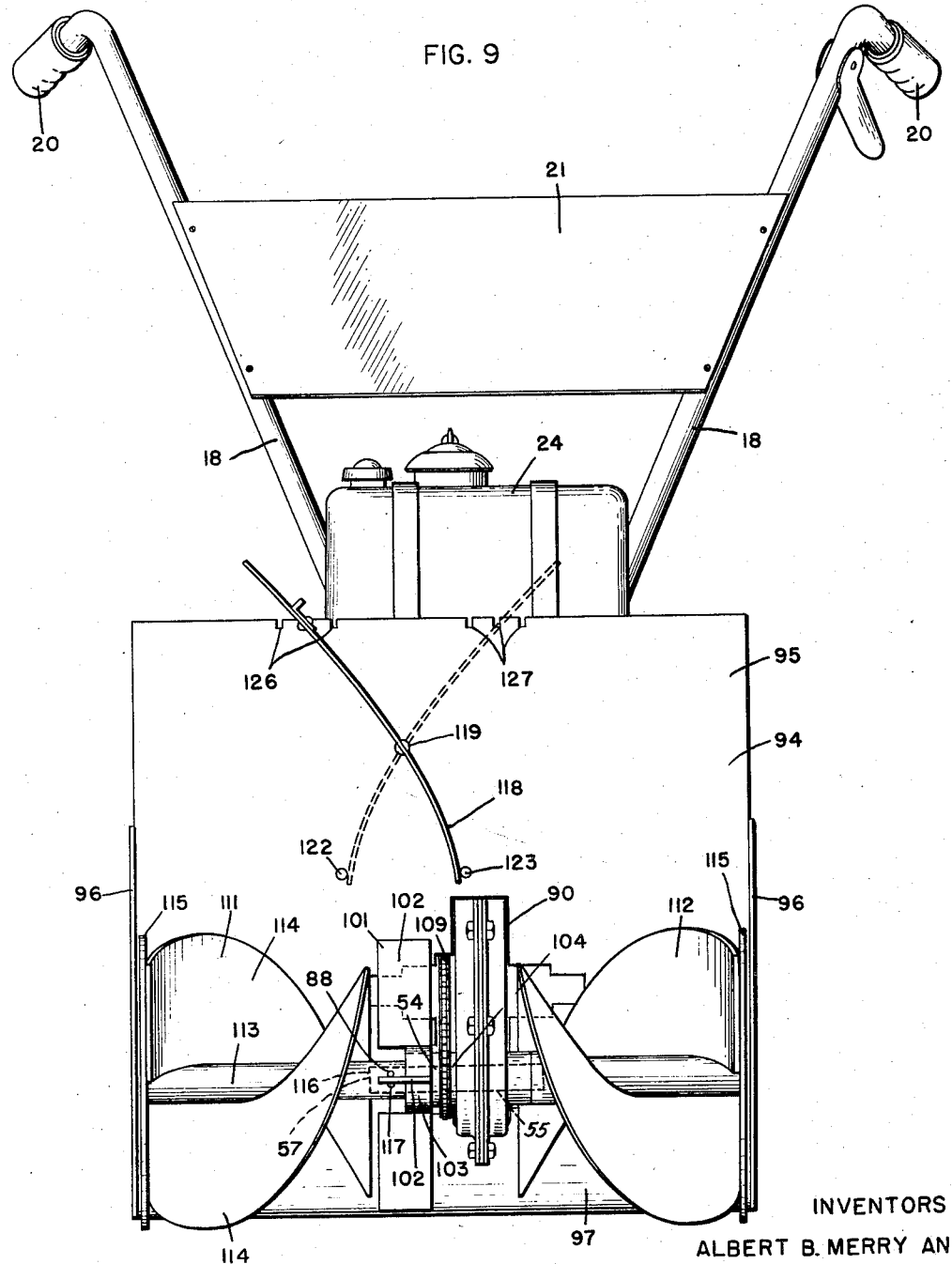
Fig. 9 is a front elevational view of the structure shown in Fig. 8.

The snow blower also includes two screw conveyors 111 and 112. These screw conveyors are right and left-hand so both of them, when the shaft 55 is driven in the proper direction, convey the snow downwardly and toward the center of the snow blower. Due to the similarity of the construction, conveyor 111, which is best shown in Fig. 9, will be described in detail. This conveyor consists of a shaft 113 which has welded to its two conveyor flights or blades 114. These blades have attached to their outer ends circular end plates 115 and are free at their inner ends and terminate short of the blower 101. The inner end of the shaft 113 extends beyond the flights 114 and has formed in it a socket 116 adapted to fit over the shaft extension 57 of the driven shaft 55. A T-shaped slot 117, similar to the slot 92, receives the pin 88 and effects a drive for said shaft. The two conveyors 111 and 112 operate within the confines of the curved portion 97 of the back 95 and the flanges 96 of hood 94.

The snow blower is supported at its forward end through the end plates 115 which act as wheels and which assist in propelling the machine in a forward direction. Frame 10 is supported at the rear by means of auxiliary wheels 128 and 129. These wheels are rotatably mounted on an axle 131 which has welded to it two angle brackets 132. These angle brackets have bolted to them by means of bolts 133 a post 134. Post 134 is slidably mounted in holes 135 and 136 formed in the plates 14 and 15. A thumb screw 137 is screwed into the end plate 19 and engages the post 134 forwardly and in a manner to clamp the same against the portions of the plates 14 and 15 at the ends of the holes 135 and 136. By means of this construction the elevation of the frame 10 above the ground may be readily controlled.

The snow blower further includes a deflector 118 formed at its center with a trunnion 119. This trunnion is pivoted to a boss 121 attached to the back 95 of the hood 94. Two stops 122 and 123 are also secured to the back 95 and the lower ends of said deflector are adapted to engage said stops as the deflector is moved from one position to the other. The deflector 118 has pivoted to it a hook 124 which is provided with a finger piece 125. This hook is adapted to be inserted into any of a number of notches 126 on one side of the medial plane of back 95 of hood 94 or other notches 127 on the other side of the medial plane of said back. The deflector 118 is constructed of fairly thin resilient material so that as the same engages the stops 122 or 123 and is further urged toward said stops, the same deflects and forms a curve which assists in discharging the snow from the blower 101. The degree of curvature can be varied by placing the hook 124 in the various notches 126 or 127 and the distance of travel and the height of the snow leaving the blower can be regulated to suit.

In the use of the snow plow the clutch 93 is engaged so that the conveyor flights 114 are caused to rotate. The blower 101 being directly connected to the countershaft 37 is similarly caused to rotate when the clutch 93 is engaged. It then merely becomes necessary to manually direct the apparatus into the snow. When the snow reaches the conveyors 111 and 112 the same drive the snow downwardly and rearwardly and at the same time progress the snow toward the blower 101. This blower then picks up the snow and directs it against the baffle 118 which causes the snow to follow along said baffle and move along the back 95 of hood 94. The snow is thus discharged outwardly and to the side of the machine and may be easily discharged from either side with the same effect.

The advantages of the invention are manifest. The power unit can be employed with a number of different yard implements and particularly implements adapted to travel over the ground. As illustrative examples, the invention has been shown as applied to a snow blower and to a mower. Other uses consist of mounting cultivator blades on the shaft extensions 56 and 57 or other similar implements. Power may be taken off from the countershaft 37 or from the driven shaft 55. The transmission including the driven shaft may be easily and quickly moved to a position in which the driven shaft is toward the forward end of the frame or to a position in which the driven shaft is toward the rear end of the frame. In this manner, implements driven either from the rear or from the front may be employed. Also, the supporting wheels may be mounted on the driven shaft and the power unit converted into a tractor.

Changes in the specific form of the invention, as herein described, may be made within the scope of what is claimed without departing from the spirit of the invention.

Having described the invention, what is claimed as new and desired to be protected by Letters Patent is:

1. A motor power unit for operating a yard implement and comprising a frame, a motor mounted on said frame and having a drive shaft, an elongated case extending in an up and down direction, pivot means acting between the upper end of said case and said frame and supporting said case for swinging movement from a first position to a second position relative to said frame, means for locking said case in various positions, a countershaft rotatably mounted in said case and concentric with said pivot means, a power transmission between said motor shaft and said countershaft, a driven shaft rotatably mounted in the lower end of the case and extending transversely of said case and a power transmission within said case and driving said driven shaft from said countershaft, said driven shaft having a shaft extension extending laterally outwardly beyond said case, said case when in its first position being disposed with said shaft extension forwardly of said motor and frame to receive and drive a rotatable yard implement, and when in its second position being disposed with said shaft extension rearwardly of said motor proper to receive and drive a traction wheel.

2. A motor power unit for operating a yard implement and comprising an elongated frame, a motor mounted on said frame and having a drive shaft extending transversely of said frame, an elongated case extending in an up and down direction and having the lower portion disposed below said frame, a countershaft extending transversely of said frame, bearings carried by said frame and supporting said countershaft for rotation, bearings on said case at the uppermost end thereof receiving said shaft and supporting said case for swinging movement relative to said frame, locking means acting between said case and frame and holding said case in fixed position, bearings in the lower end of said case, a driven shaft journaled in said bearings and parallel with said countershaft, transmission means between said motor shaft and countershaft, transmission means between said countershaft and driven shaft and contained within said case, and an extension on said driven shaft extending laterally outwardly beyond said case.

3. A traveling motor power unit for operating a yard implement and comprising a frame, a motor mounted on said frame and having a drive shaft, an elongated case extending in an up and down direction, pivot means acting between the upper end of said case and said frame and supporting said case for swinging movement from a forward position to a rearward position, means for locking said case from movement relative to said frame when in either of said positions, a countershaft rotatably mounted in said case at the upper end thereof and concentric with said pivot means, a power transmission between said motor shaft and said countershaft, a driven shaft rotatably mounted in the lower end of the case and extending transversely of the direction of travel of said unit and a power transmission within said case and driving said driven shaft from said countershaft, said driven shaft having a shaft extension extending laterally outwardly beyond the case, said case when in its forward position being disposed with said shaft extension forwardly of said motor and frame to receive and drive a rotatable yard implement and when in its rearward position being disposed with said shaft extension rearwardly of the motor proper to receive and drive a traction wheel.

4. A traveling motor power unit for operating a yard implement having a first rotatable member driven at a relatively low rate of peripheral speed and a second rotatable member simultaneously driven at a relatively higher rate of peripheral speed, said power unit comprising a frame, a motor mounted on said frame and having a drive shaft, bearings attached to said frame, a countershaft journaled in said bearings and extending transversely of the direction of travel of the unit, an elongated case disposed below said frame and extending in an up and down direction, bearings on said case at the upper end thereof and receiving said shaft and supporting said case for swinging movement in a vertical plane, means for holding said case in various positions relative to the frame and including a forward position, bearings at the lower end of said case, a driven shaft journaled in said bearings, an extension on said shaft and to which the first rotatable member of the implement may be attached when the case is in its forward position, a transmission between said drive shaft and countershaft, a transmission within said case driven by said countershaft and driving said driven shaft, one of said transmissions being a speed reduction transmission, rotating means on said countershaft, a transmission between the rotating means on the countershaft and said second rotatable member and lying exteriorly of said case.

5. A traveling motor power unit for operating a yard implement having a first rotatable member driven at a relatively low rate of peripheral speed and a second rotatable member coaxial with said first rotatable member and simultaneously driven at a relatively higher rate of peripheral speed, said power unit comprising a motor mounted on said frame and having a drive shaft, bearings attached to said frame, a countershaft journaled in said bearings and extending transversely of the direction of travel of the unit, an elongated case disposed below said frame and extending in an up and down direction, bearings on said case at the upper end thereof and receiving said shaft and supporting said case for swinging movement in a vertical plane, means for holding said case in various positions relative to the frame and including a forward position, bearings at the lower end of said case, a driven shaft journaled in said bearings, an extension on said shaft and to which the first rotating member of the yard implement may be attached when the case is in its forward position, a transmission between said drive shaft and countershaft, a transmission within said case driven by said countershaft and driving said driven shaft, one of said transmissions being a speed reduction transmission, rotating means on said countershaft, a transmission between the rotating means on the countershaft and said second rotatable member and lying exteriorly of said case.

6. In combination, a frame having a rearward portion and a forward portion, a motor mounted on said frame and having a drive shaft, an elongated case extending in an up and down direction, pivot means acting between the upper end of said case and said frame and supporting said case for swinging movement from a rearward position to a forward position relative to the frame, means for locking said case from movement when in its forward position, a countershaft rotatably mounted in said case and concentric with said pivot means, a power transmission between said motor shaft and said countershaft, a driven shaft rotatably mounted in the lower end of the case and extending transversely of said case, a power transmission within said case and driving said driven shaft from said countershaft, one of said transmissions being a speed reduction transmission, said driven shaft having shaft extensions extending beyond said case, a snow removal implement having a pair of rotary coaxial screw type conveyor members mounted on and driven by said shaft extensions and further having a blower member disposed between said conveyor members and coaxial relative thereto, means carried by said case and supporting said blower member for rotation, rotating means on said countershaft and a transmission between the rotating means on said countershaft and said blower member and driving said blower member at a greater rate of speed.

References Cited in the file of this patent

UNITED STATES PATENTS

| | | |
|---|---|---|
| 1,413,100 | Cox | Apr. 18, 1922 |
| 2,387,423 | Venable | Oct. 23, 1945 |
| 2,696,705 | Greber | Dec. 14, 1954 |
| 2,750,859 | Smithburn | June 19, 1956 |
| 2,751,697 | Bucher | June 26, 1956 |

FOREIGN PATENTS

| | | |
|---|---|---|
| 163,777 | Austria | Jan. 15, 1949 |